Figure 1:
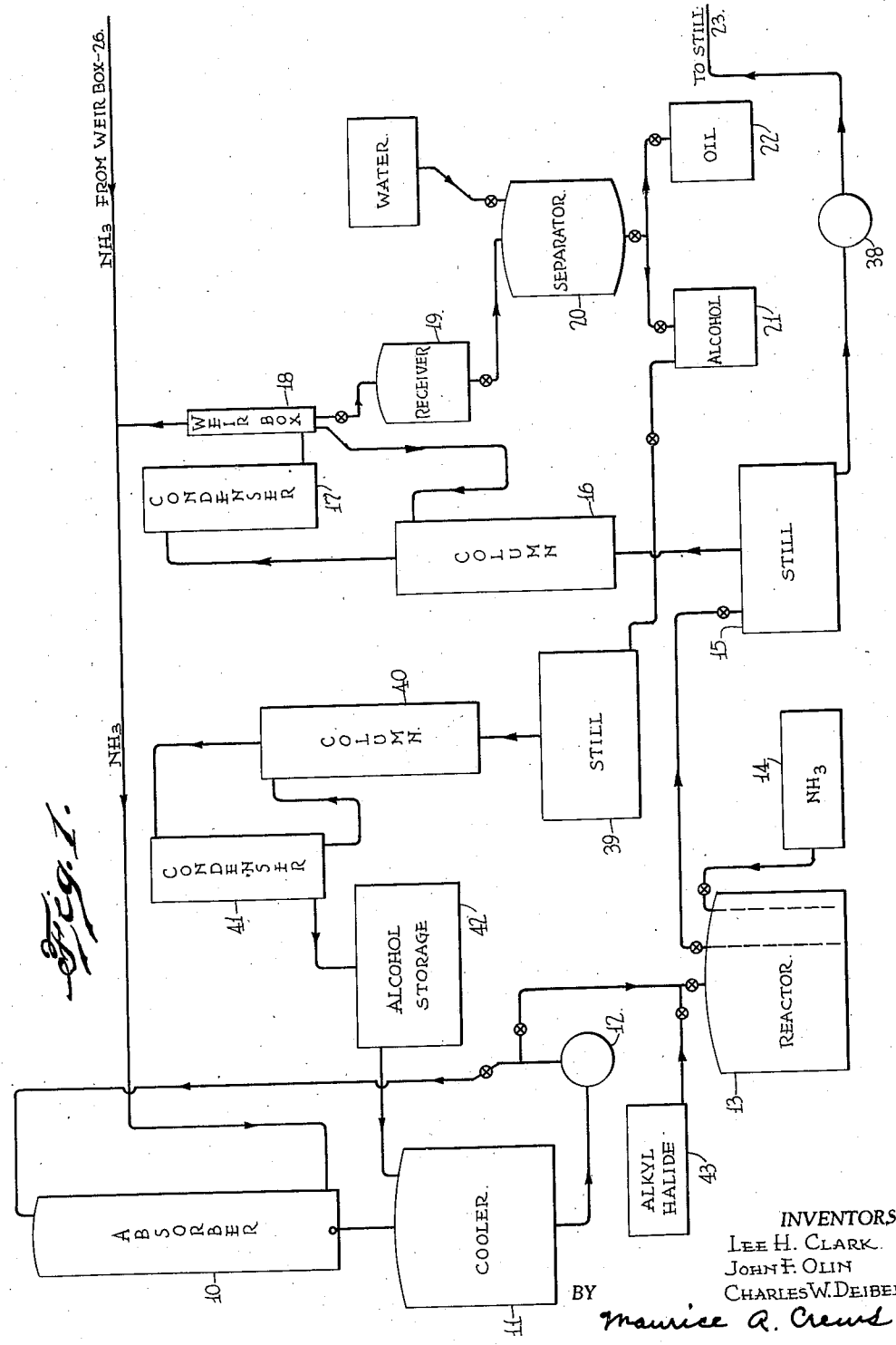

Dec. 12, 1939.  L. H. CLARK ET AL  2,183,499
MANUFACTURE OF AMINES
Filed April 1, 1937  2 Sheets-Sheet 1

INVENTORS.
LEE H. CLARK.
JOHN F. OLIN
CHARLES W. DEIBEL.
BY Maurice A. Crews
ATTORNEY.

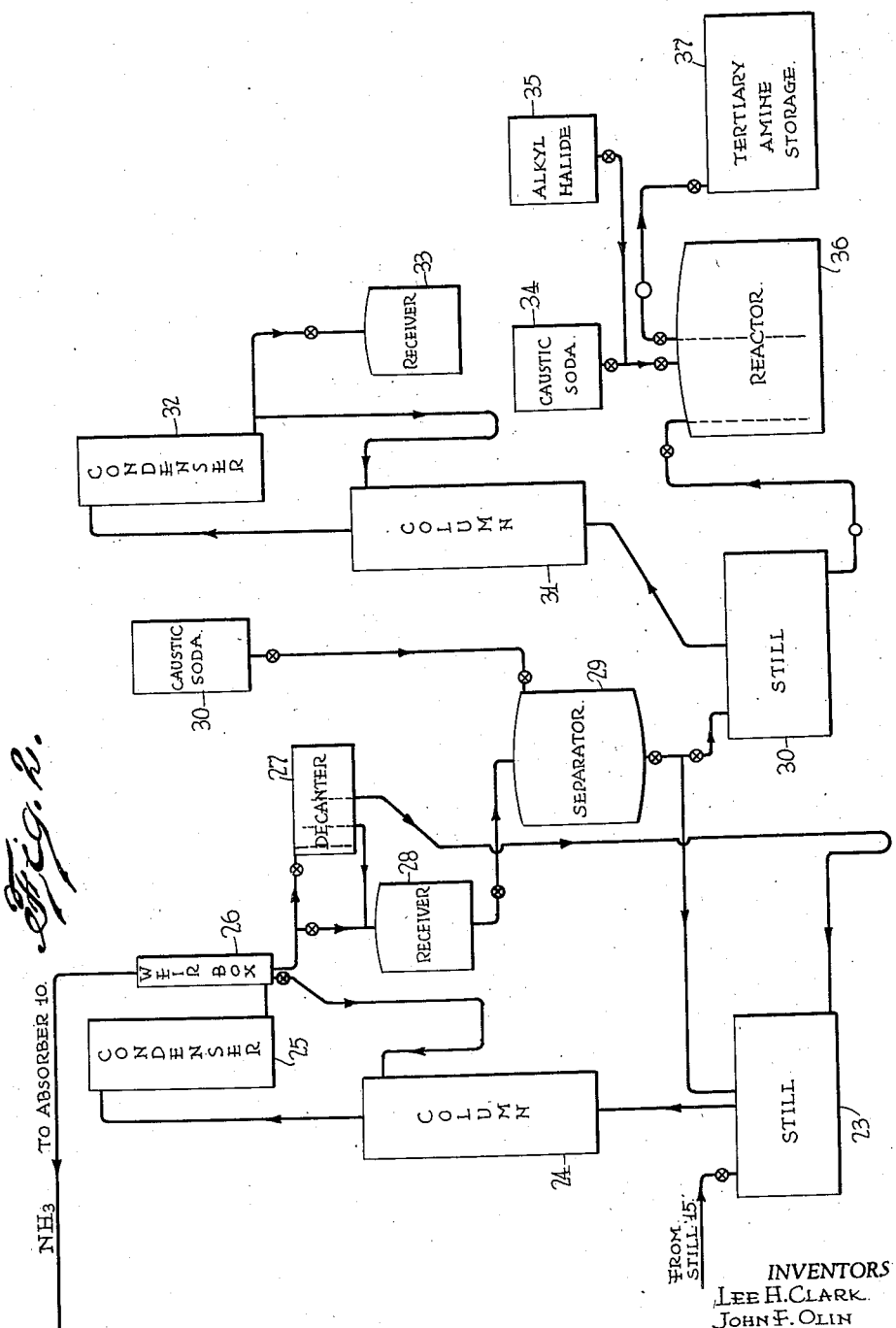

Patented Dec. 12, 1939

2,183,499

UNITED STATES PATENT OFFICE 2,183,499

MANUFACTURE OF AMINES

Lee H. Clark and John F. Olin, Grosse Ile, and Charles W. Deibel, Wyandotte, Mich., assignors to The Sharples Solvents Corporation, Philadelphia, Pa., a corporation of Delaware Application April 1, 1937, Serial No. 134,266

9 Claims. (Cl. 260—585)

The present invention pertains to the manufacture of amino and poly-amino derivatives of paraffinic and cyclo-paraffinic hydrocarbon compounds. It includes within its broadest scope a process applicable to the amination of such hydrocarbon compounds regardless of whether they be unsubstituted or whether they contain aryl, or other substituents for one or more of their hydrogen atoms.

Thus, the invention is applicable to the amination of aliphatic or poly-methylene hydrocarbon compounds containing from one to twenty carbon atoms, regardless of whether other atoms or radicals be substituted for part of the hydrogen content of the molecule which is subjected to the amination reaction. The details of the invention were developed in connection with experiments involving the production of alkyl amines containing between four and eight carbon atoms in their alkyl radicals by reacting ammonia or amines with alkyl halides. The invention has resulted in the development of a commercial process capable of producing amines such as butyl amine, amyl amine, hexyl amine, cyclo-hexyl amine, heptyl amine, octyl amine etc., economically and in large quantities. The principal application of the invention has been made in connection with the manufacture of mono-, di- and tri-amyl amines by the reaction of amyl chlorides with ammonia and the invention will be described with reference to the manufacture of such compounds by ammonolysis of alkyl halides, although it will be understood that the procedure of the invention is also applicable to the manufacture of corresponding amino compounds containing other hydrocarbon radicals as substituents for the hydrogen of ammonia as discussed above.

A primary object of the invention has been to improve upon the yields obtained in connection with the manufacture of amines by reaction of amyl chloride with ammonia or amines. A second object has been to effect economies in an operation of this character by improving the rates at which the ammonolysis reactions occur.

The manner in which the objects of the invention have been attained will be evident from a reading of the following specification in the light of the attached flow sheet in which the single figure (on two sheets) constitutes a diagrammatic representation of the performance of the steps of the process.

Referring to the flow sheet by reference characters, an alcohol such as ethyl alcohol, capable of absorbing ammonia, is maintained in a container 10 and is impelled by a pump 12 through that container and through a cooler 11 in a counter-current direction with respect to a stream of ammonia gas which issues from apparatus in which the ammonolysis process with respect to a prior batch of material is taking place. When alcohol in the absorber 10 has become substantially saturated with ammonia from a prior batch, the alcohol from absorber 10 is passed to the reactor 13 and the alkyl halide, such as amyl chloride to be reacted with ammonia, is similarly passed from container 43 into reactor 13. Ammonia gas is introduced into the bottom of reactor 13 from a container 14. The ratio of ammonia to amyl chloride introduced into the reactor 13 is dependent upon whether the operator desires to manufacture a product predominating in mono-amyl amine, or whether he desires to produce a preponderance of di- or tri-amyl amines.

A large proportion of ammonia to amyl chloride favors the production of mono-amyl amine while a smaller proportion of ammonia favors the production of di- and tri-amyl amines. If a mixture containing a great preponderance of mono-amyl amine is to be produced, a quantity of ammonia constituting from six to ten times the theoretical molecular quantity necessary to react with the amyl chloride should be introduced. The charge in the reactor 13 is heated to a temperature between 135 and 145° C. and is agitated for a period of four hours or more. A maximum pressure of approximately 450 pounds is developed incident to this operation. The desired reactions which take place in the reactor 13 may be described by the following equations:

1. $RX + NH_3 \rightarrow RNH_3X$
2. $RNH_3X + RX + NH_3 \rightarrow R_2NH_2X + NH_4X$
3. $R_2NH_2X + RX + NH_3 \rightarrow R_3NHX + NH_4X$ R representing a substituted or unsubstituted alkyl or cyclo-aromatic radical, X a halogen, N nitrogen and H hydrogen.

The following incidental reactions also occur:

4. $EtOH + RX \rightarrow EtOR + HX$
5. $RX + NH_3 + H_2O \rightarrow ROH + NH_4X$ Et representing an ethyl radical, O oxygen and the remaining designations being the same as in Equations 1 to 3.

It will thus be seen that, in the case of the manufacture of amyl amines by reaction of amyl chlorides with ammonia in the presence of methyl or ethyl alcohol, for example, the reaction mixture in the reactor 13 contains, at the conclusion of the reaction, in addition to certain quantities of the starting materials, amyl ammonium chloride, di-amyl ammonium chloride, tri-amyl ammonium chloride, ammonium chloride, amyl ethyl ether and amyl alcohol.

The problems solved by the present invention relate to the conversion of the three amyl ammonium chlorides referred to above to the corresponding alkyl amines by the splitting of hydrogen chloride from these compounds, and to the performance of this operation and of the operations of separating undesired ingredients from the desired amyl amines in such a way as to obtain a maximum yield of the desired amines.

The mixture from the reactor 13 is impelled to a still 15 under the pressure developed by the heat applied to the reactor 13. Ammonia containing small amounts of other constituents of the mixture in the still 15 is first distilled through column 16, condenser 17 and weir box 18 and passed into the base of absorber 10. This ammonia passes in counter-current relationship with respect to a fresh batch of cool alcohol from the cooler 11. By absorbing ammonia from the still 15 in alcohol to be used with the next reaction mixture in the reactor 13, valuable constituents which might otherwise pass from the process with the ammonia distilled from still 15 are retained in the process. A reflux of distillate from the still 15 having a boiling point higher than that of ammonia is maintained in the column 16 until tests indicate that the still contains less than 1.0% alkalinity, calculated as ammonia.

After the unreacted ammonia has been distilled from still 15 and absorbed in alcohol in the absorber 10, ethyl alcohol, unreacted amyl chloride, amyl ethyl ether, amyl alcohol, a small quantity of amines, amylene and water are distilled to receiver 19 through the condenser 17 and weir box 18. The mixture of these materials is then passed to separator 20 and separates into an upper oily layer and a lower aqueous layer in that separator. The aqueous layer consists principally of ethyl alcohol and water, while the oily layer contains amyl chloride, amyl ethyl ether, and amyl alcohol. The aqueous phase is dripped from the separator 20 to an alcohol receiver 21. After the aqueous phase has been removed from the separator 20, water is introduced into that separator to remove further aqueous material from the oil phase remaining in the separator. This water containing material absorbed from the oil phase is then likewise passed to the receiver 21 and the oil phase from the separator 20 is thereafter passed to the oil receiver 22. The alkyl halide content of this oil phase is preferably separated by distillation and decantation and thereafter subjected to ammonolysis with a fresh batch of material in the reactor 13. Distillation in still 15 is continued until the residue in that still is free of alcohol and oil.

The residue from the still 15, which contains the amyl ammonium chloride salts and some ammonium chloride, is transferred by pump 38 to still 23. Caustic soda solution which may contain between 35 and 45% caustic soda is passed from a separator 29 into contact with the salts in the still 23. This caustic soda solution effects conversion of the amyl ammonium chloride salts into the corresponding amines and sodium chloride, as indicated by the following equations:

6. $RNH_3X + NaOH \rightarrow RNH_2 + NaX + H_2O$
7. $R_2NH_2X + NaOH \rightarrow R_2NH + NaX + H_2O$
8. $R_3NHX + NaOH \rightarrow R_3N + NaX + H_2O$.

The amines formed in the still 23 are distilled from that still through column 24, condenser 25, weir box 26 and decanter 27 to receiver 28, free ammonia present or formed by decomposition of ammonium chloride incident to the conversion and distillation operations performed in still 23 being passed from the weir box 26 to absorber 10 and flowing in counter-current relationship with respect to cool alcohol from the cooler 11, as described above with respect to ammonia from weir box 18.

Mono-amyl amine is miscible with water, while di- and tri-amyl amines are but little soluble in water. In the distillation of mono-, di- and tri-amyl amines from the still 23, the distillate is passed directly to receiver 28 without passing through decanter 27 as long as the only amino material contained in that distillate is mono-amyl amine. Just as soon as material in the weir box 26 separates into two layers, however, the operator will know that poly-amyl amines are reaching the condenser 25 and that the distillation of mono amyl amine is substantially completed. The remaining distillate is thereafter passed directly from the weir box 26 to a decanter 27 instead of being passed to the receiver 28. The material in the decanter 27 separates into a lower aqueous phase containing water and some mono amyl amine and into an upper oil phase containing principally poly-amyl amines. The oil phase from decanter 27 is decanted to receiver 28 while the aqueous phase is returned to the conversion still 23. By returning this aqueous phase to the conversion still and reworking it with fresh crude amino material to be converted, the valuable material contained in the aqueous phase from the decanter 27 is retained in the system.

The crude mono-, di- and tri-amyl amine mixture which reaches the receiver 28 from the weir box 26 and decanter 27, respectively, is passed to a separator 29 and is treated with caustic soda in that separator. Caustic soda solution of approximately 50% concentration may, for example, be passed from the caustic soda container 30 into the separator 29. Water with which amines dropping from the receiver 28 are contaminated is absorbed by the caustic soda solution, and the caustic soda solution, diluted in this manner, is thereafter passed to the crude amine conversion still 23 and used in the splitting of further amyl ammonium chloride to produce amines and in splitting ammonium chloride to recover ammonia from a succeeding batch of such material. By employing the caustic soda used in the drying operation in the separator 29 for converting further crude amino material into the desired amyl amines, valuable material such as amyl amine, which may be absorbed in this caustic soda incident to the washing step, is retained in the system.

The dried amines from the separator 29 are passed to a still 30 in which they are separated into their constitutents. Monoamyl amine from this still is passed overhead through column 31 and condenser 32 to receiver 33. Di-amyl amine may thereafter be purified by vacuum distillation in the still 30.

In case tri-amyl amine is to be produced, crude di-amyl amine remaining in the still 30 is passed to a reactor 36 where it is mixed with the desired proportion of amyl chloride from the container 34 and caustic soda solution from the container 35. The mixture in the reactor 36 is heated to a temperature between 190 and 200° C. while agitating the mixture for a period of approximately six hours. The maximum pressure developed incident to this operation is approximately 300 pounds per square inch. The reaction which takes place in the reactor 36 may be described by the following equation:

$R_2NH + RX + NaOH \rightarrow R_3N + NaX + H_2O$.

The crude reaction mixture from the reactor 36 is thereafter passed to a storage tank 37, whence it may be passed to a still for the purpose of separating the desired tri-amyl amine from the crude mixture.

Alcohol from container 21 may be passed to a still 39 and subjected to rectification through a column 40 and condenser 41 to separate water therefrom. Alcohol condensed at 41 may be subsequently passed from storage tank 42 into cooler 11 for re-use in the practice of the process. By re-using recovered alcohol from the process for dilution of material used in subsequent batches in the reactor 13, any constituents which are valuable in the subsequent practice of the process, such as amines or ammonia which are contained in the alcohol in the container 42, are retained.

*Specific example*

In a typical example of the practice of the process, ethyl alcohol of 80% concentration was maintained at a temperature of about 20° C. and circulated through three absorbers 10, arranged in series, in counter-current flow with respect to ammonia, amines and other gases passing from weir boxes 18 and 26 in connection with distillation of previous batches. At the conclusion of this absorption operation 420 gallons of the alcohol containing 355 pounds of absorbed material consisting principally of ammonia were charged to the reactor 13. 190 gallons of amyl chloride were later charged to the reactor 13 from container 43 and 180 pounds of anhydrous ammonia were thereafter introduced from container 14 into the bottom of the reactor.

The reactor 13 was then heated to a temperature between 135 and 145° C. for a period of two hours during agitation of the contents of the reactor. The temperature was gradually increased over a further period of two hours, the pressure being held below 425 pounds per square inch.

The contents of the reactor 13 were then passed to still 15. Ammonia was distilled from still 15 and other constituents of the distillate were refluxed until tests conducted on samples from still 15 indicated that the still contained less than 1% ammonia. The distillation was then continued until a withdrawn sample of the distillate had a specific gravity of 0.997 and was free of oily constituents, and the distillate, consisting principally of water, ethyl alcohol, amyl chloride and amyl alcohol, was condensed and collected in receiver 19. Material from receiver 19 was then passed to separator 20.

Material in separator 20 was allowed to separate into an upper oily phase and a lower aqueous phase containing alcohol, and the aqueous phase was then passed to container 21. A quantity of water equal to the remaining oily material in separator 20 was then mixed with that oil and the contents of the separator were again allowed to subside into oily and aqueous layers. The resulting aqueous layer was drawn off to container 21 and the oily layer to container 22.

The residue in the still 15, consisting principally of amyl ammonium chloride, was transferred by pump 36 to still 23. 115 gallons of caustic soda solution of approximately 42% concentration were passed to still 23. Still 15 was washed with approximately 75 gallons of water and the washed water was pumped to still 23. Heat was applied to still 23 and ammonia passed from the system through column 24, condenser 25 and weir box 26 into counter-current flow with respect to alcohol in the absorbers 10.

Mono-alkyl amines were condensed to weir box 26 and drawn off from that weir box to receiver 28 during the maintenance of a reflux ratio of approximately 1:1. As soon as the material in the weir box 26 began to separate into two layers, passage of material directly to receiver 28 was stopped and further material passed to decanter 27. The aqueous phase separated in this decanter was returned to still 23 and the oily phase passed to receiver 28. The mixed amines in receiver 28, which contained a substantial quantity of water, were dropped to separator 29. Approximately 55 gallons of caustic soda of 50% concentration were added to the material in this separator and the caustic soda, diluted with water absorbed from the amines in separator 29, was thereafter dropped to still 23 to be used in the conversion of further amyl ammonium chloride. The de-hydrated crude amines from the separator 29 were passed to the still 30. Mono-amyl amine and water were removed from the crude amine mixture in still 30 by distillation through column 31 and condenser 32 to receiver 33. Various fractions were taken consisting of a heads fraction of amine and water, finished mono-amyl amine and a final fraction containing di-amyl amine and mono-amyl amine. The heads fraction was treated with 40 gallons of 50% caustic soda solution in separator 29. The heads and tails fractions were held for further re-working. The crude poly-amyl amine material remaining in the still was then passed to reactor 36.

Alcohol from container 21 was passed to a still 39 and rectified by still 39, column 40 and condenser 41 to effect removal of the major part of the water which it contained. The rectified alcohol was passed from storage tank 42 and thence to cooler 11 associated with absorber 10. This alcohol was thus re-used in the practice of the process with respect to subsequent batches of material.

In a typical example of the manufacture of tri-amyl amine, 320 gallons of crude poly-amyl amine were passed to reactor 36 and mixed with 180 gallons of amyl chloride, 80 gallons of 50% caustic soda solution and 30 gallons of water. The material in the reactor 36 was heated to a temperature between 190° and 200° C. for approximately six hours developing a maximum pressure of 250 pounds per square inch, and was then passed to a crude tertiary amyl amine storage tank 37 from which it was passed to apparatus for effecting further purification.

While the invention has been described specifically with reference to the manufacture of mono-, di- and tri-amyl amines by reacting amyl chloride with ammonia in the presence of ethyl alcohol, it will be understood that methyl alcohol may be substituted for ethyl alcohol. It will be further understood that other halides may be substituted for amyl chloride, that alkylene diamines may be produced by reaction between alkylene di-halides and ammonia and that still other modifications of the invention with respect to details of operation and compounds reacted and produced as described in the preliminary portions of the present specification come within the scope of the invention.

We claim:

1. In the process of producing amino derivatives of alkanes and cyclo-alkanes containing between four and eight carbon atoms by ammonolysis of a halogen derivative of the hydrocarbon compound corresponding to the desired amino derivative, comprising reacting ammonia with said halogen derivative, and separating ammonia, together with small quantities of other constituents of the reaction mixture, from the reaction product by distillation, the steps comprising absorbing separated ammonia and said constituents in a lower aliphatic alcohol which is a mutual solvent for ammonia and said halogen derivative, mixing said solvent containing the absorbed ammonia and other constituents with a fresh quantity of said halogen derivative and reacting said fresh quantity of the halogen derivative with ammonia of the mixture so formed.

2. In the process of producing amino derivatives of alkanes and cyclo-alkanes containing between four and eight carbon atoms by ammonolysis of a halogen derivative of the hydrocarbon compound corresponding to the desired amino derivative, comprising reacting ammonia with said halogen derivative, and separating ammonia, together with small quantities of other constituents of the reaction mixture, from the reaction product by distillation, the steps comprising absorbing separated ammonia and said constituents in a solvent chosen from the class consisting of methyl and ethyl alcohols, mixing said solvent containing the absorbed ammonia and other constituents with a fresh quantity of said halogen derivative and reacting said fresh quantity of the halogen derivative with ammonia of the mixture so formed.

3. In the process of producing amino derivatives of alkanes and cyclo-alkanes containing between four and eight carbon atoms by ammonolysis of a halogen derivative of the hydrocarbon compound corresponding to the desired amino derivative, comprising reacting ammonia with said halogen derivative, treating the reaction product with an alkali metal hydroxide solution to split hydrogen halide from the ammonium halide compounds produced as the result of said reaction, and removing ammonia, together with small quantities of other constituents of the reaction mixture, from the reaction mixture produced by treating said ammonia derivative with said alkali metal hydroxide solution, the steps comprising absorbing separated ammonia and said constituents in a solvent chosen from the class consisting of methyl and ethyl alcohols, mixing said solvent containing the absorbed ammonia and other constituents with a fresh quantity of said halogen derivative and reacting said fresh quantity of the halogen derivative with ammonia of the mixture so formed.

4. In the process of producing amino derivatives of alkanes and cyclo-alkanes containing between four and eight carbon atoms by ammonolysis of a halogen derivative of the hydrocarbon compound corresponding to the desired amino derivative, comprising reacting ammonia with said halogen derivative, treating the reaction product with an alkali metal hydroxide solution to split hydrogen halide from the ammonium halide compounds produced as the result of said reaction, and removing ammonia, together with small quantities of other constituents of the reaction mixture, from the reaction mixture produced by treating said ammonia derivative with said alkali metal hydroxide solution, the steps comprising absorbing separated ammonia and said constituents in a lower aliphatic alcohol which is a mutual solvent for ammonia and said halogen derivative, mixing said solvent containing the absorbed ammonia and other constituents with a fresh quantity of said halogen derivative and reacting said fresh quantity of the halogen derivative with ammonia of the mixture so formed.

5. In the process of producing amino derivatives of alkanes and cyclo-alkanes containing between four and eight carbon atoms by ammonolysis of a halogen derivative of the hydrocarbon compound corresponding to the desired amino derivative, comprising reacting ammonia with said halogen derivative, treating the reaction product with an alkali metal hydroxide solution to split hydrogen halide from the ammonium halide compounds produced as the result of said reaction, and distilling amines formed by the splitting reaction, the steps comprising removing water from said distilled amines by treatment with an alkali metal hydroxide dehydrating agent, and thereafter passing the aqueous alkali metal hydroxide containing fraction resulting from said water removing operation, together with reaction products absorbed thereby, to the splitting operation to effect splitting of hydrogen halide from the ammonium halide compounds of a subsequent batch of material.

6. In the process of producing amino derivatives of alkanes and cyclo-alkanes containing between four and eight carbon atoms by ammonolysis of a halogen derivative of the hydrocarbon compound corresponding to the desired amino derivative, comprising reacting ammonia with said halogen derivative, treating the reaction product with sodium hydroxide to split hydrogen halide from the ammonium halide compounds produced as the result of said reaction, and distilling amines formed by said splitting reaction, the steps comprising removing water from said distilled amines by treatment thereof with sodium hydroxide, and thereafter passing the aqueous sodium hydroxide containing fraction resulting from said water-removing operation, together with reaction products absorbed thereby, to the splitting operation to effect splitting of hydrogen halide from the ammonium halide compounds of a subsequent batch of material.

7. In the process of producing amino derivatives of alkanes and cyclo-alkanes containing between four and eight carbon atoms by ammonolysis of a halogen derivative of the hydrocarbon compound corresponding to the desired amino derivative, comprising reacting ammonia with said halogen derivative, treating the reaction product with a sodium hydroxide solution to split hydrogen halide from the ammonium halide compound produced as the result of said reaction, and distilling amines formed by said splitting reaction, the steps comprising removing water from said distilled amines by treatment with an alkali metal hydroxide solution of approximately 50% concentration, and thereafter passing the aqueous alkali metal hydroxide containing fraction resulting from said water removing operation, together with reaction products absorbed thereby, to the splitting operation to effect splitting of hydrogen halide from the alkyl ammonium halide compounds of a subsequent batch of material.

8. In the process of producing amino derivatives of alkanes and cyclo-alkanes containing between 4 and 8 carbon atoms by ammonolysis of halogen derivative of the hydrocarbon compound corresponding to the desired amino derivative, comprising reacting ammonia with said halogen derivative in the presence of a lower aliphatic alcohol which is a mutual solvent for ammonia and said halogen derivative, separating ammonia, together with small quantities of other constituents of the reaction mixture, from the reaction product, and separating said mutual solvent together with small quantities of other constituents of the reaction mixture, from the bulk of the reaction product, the steps comprising absorbing said separated ammonia and associated constituents in said separated mutual solvent and associated constituents while chilling said mutual solvent, and mixing the solution of separated ammonia and associated constituents in separated solvent with a fresh batch of the halogen derivative in the further performance of the process.

9. In the process of producing amino derivatives of alkanes and cyclo-alkanes containing between 4 and 8 carbon atoms by ammonolysis of a halogen derivative of the hydrocarbon compound corresponding to the desired amino derivative by reacting ammonia with said halogen derivative in the presence of a lower aliphatic alcohol which is a mutual solvent for said halogen derivative and ammonia, separating ammonia, together with small quantities of other constituents of the reaction mixture, from the reaction product, separating said alcohol, together with small quantities of other constituents of the reaction mixture, from the remainder of the reaction product, treating said reaction product with a dilute solution of an alkali metal hydroxide to split halide salts of amines, separating said amines from the split reaction mass by distillation and drying the separated amines by contact with a solution of an alkali metal hydroxide; the steps comprising cooling said alcohol containing other reaction constituents separated from the reaction product, absorbing said ammonia, containing other reaction constituents, separated from the reaction product, in said cooled alcohol, adding said cooled alcohol with ammonia and other constituents absorbed therein to a further quantity of said halogen derivative in the step in which said halogen derivative is reacted with ammonia and utilizing the dilute solution of alkali metal hydroxide from said drying step as the said dilute solution to split halide acid salts of amines.

LEE H. CLARK.
JOHN F. OLIN.
CHARLES W. DEIBEL.

CERTIFICATE OF CORRECTION.

Patent No. 2,183,499. December 12, 1939.

LEE H. CLARK, ET AL.

It is hereby certified that error appears in the printed specification of the above numbered patent requiring correction as follows: Page 1, first column, line 3-4, for "comounds" read compounds; page 2, first column, line 38, for "dripped" read dropped; page 4, second column, line 68, claim 8, after "of" insert a; and that the said Letters Patent should be read with this correction therein that the same may conform to the record of the case in the Patent Office.

Signed and sealed this 6th day of February, A. D. 1940.

Henry Van Arsdale,
Acting Commissioner of Patents.

(Seal)